United States Patent

Unland et al.

[11] Patent Number: 5,680,763
[45] Date of Patent: Oct. 28, 1997

[54] SYSTEM FOR CONTROLLING A CHARGING OF AN INTERNAL COMBUSTION ENGINE

[75] Inventors: Stefan Unland; Oskar Torno, both of Schwieberdingen; Werner Haeming, Neudenau; Iwan Surjadi, Vaihingen; Robert Sloboda, Markgroeningen; Michael Baeuerle, Besigheim, all of Germany

[73] Assignee: Robert Bosch GmbH, Stuttgart, Germany

[21] Appl. No.: 550,483

[22] Filed: Oct. 30, 1995

[30] Foreign Application Priority Data

Jan. 25, 1995 [DE] Germany .................. 1 95 02 150.9

[51] Int. Cl.$^6$ ............................................. F02B 37/12
[52] U.S. Cl. ............................................. 60/602
[58] Field of Search ........................... 60/600, 601, 602, 60/603; 123/564

[56] References Cited

U.S. PATENT DOCUMENTS

| | | | |
|---|---|---|---|
| 5,121,604 | 6/1992 | Berger et al. | 60/602 |
| 5,123,246 | 6/1992 | Younessi et al. | 60/602 |
| 5,442,918 | 8/1995 | Baeuerle et al. | 60/602 |
| 5,551,235 | 9/1996 | Entenmann et al. | 60/602 |

FOREIGN PATENT DOCUMENTS

| | | |
|---|---|---|
| 0 084 037 | 7/1983 | European Pat. Off. . |
| 43 44 960 | 7/1995 | Germany . |

*Primary Examiner*—Michael Koczo
*Attorney, Agent, or Firm*—Kenyon & Kenyon

[57] ABSTRACT

A system for controlling the charging of an internal combustion engine contains an integral controller. If appropriate, a proportional controller and/or a differential controller may also be present. The integration, carried out by the integral controller, of the control error is limited to a prescribable limit value in order to avoid severe overshoots. Various limit values for steady-state operating states and for dynamic operating states can be prescribed. The dynamic limit value can be provided with corrections as a function of characteristic operating variables and with an adaptive correction and can be additionally increased by a safety interval.

12 Claims, 3 Drawing Sheets

SYSTEM FOR CONTROLLING A CHARGING OF AN INTERNAL COMBUSTION ENGINE

BACKGROUND INFORMATION

A system for controlling the charging of an internal combustion engine is described in European Patent Application No. EP 0 084 037 B1. In this system, the charging pressure is adjusted to a desired value using a controller, the desired value being read out from a load-dependent and rotational-speed-dependent characteristic diagram and subsequently corrected as a function of the atmospheric pressure, the exhaust gas temperature, the air temperature or the acceleration. Depending on the type of internal combustion engine and the particular application, a controller with proportional, differential and/or integral behavior is used.

German Patent Application No. DE 43 44 960 describes a system for controlling the charging of an internal combustion engine, in which the controller parameters of the controller are continuously optimized. For this purpose, a model is prescribed for the internal combustion engine including the charging device, and the parameters of the model are obtained from the controlled variable and the actual value for the charging. The controller parameters are determined from the model parameters which have been obtained in this way and are passed on to the controller.

The present invention has the object of further improving the known control systems and permitting better control of the charging of the internal combustion engine.

SUMMARY OF THE INVENTION

The present invention has the advantage that it permits optimum control of the charging of an internal combustion engine. The limiting of the integral portion of the controller according to the present invention is particularly advantageous, during which limiting various limit values can be prescribed for steady-state and for dynamic operating states. In this way, severe overshoots during the control can be avoided and, nevertheless, a rapid transient behavior of the controller is achieved. The dynamic limit value can be prescribed as a function of at least one characteristic operating variable in order to adapt the controller as precisely as possible to the prevailing operating state. In addition, by virtue of the adaptive adjustment of the limit value, a continuously good control quality can be ensured, even if the components involved in the control are contaminated or worn. In order to ensure that the dynamic limit value is not selected to be too small, the value can be increased by a safety interval. The dynamic limit value is effective in each case for only one prescribable time period. Subsequently, the system is switched over to the static limit value which is higher than the dynamic limit value in order to ensure reliable compensation even in extreme situations.

DETAILED DESCRIPTION

Figure 1:
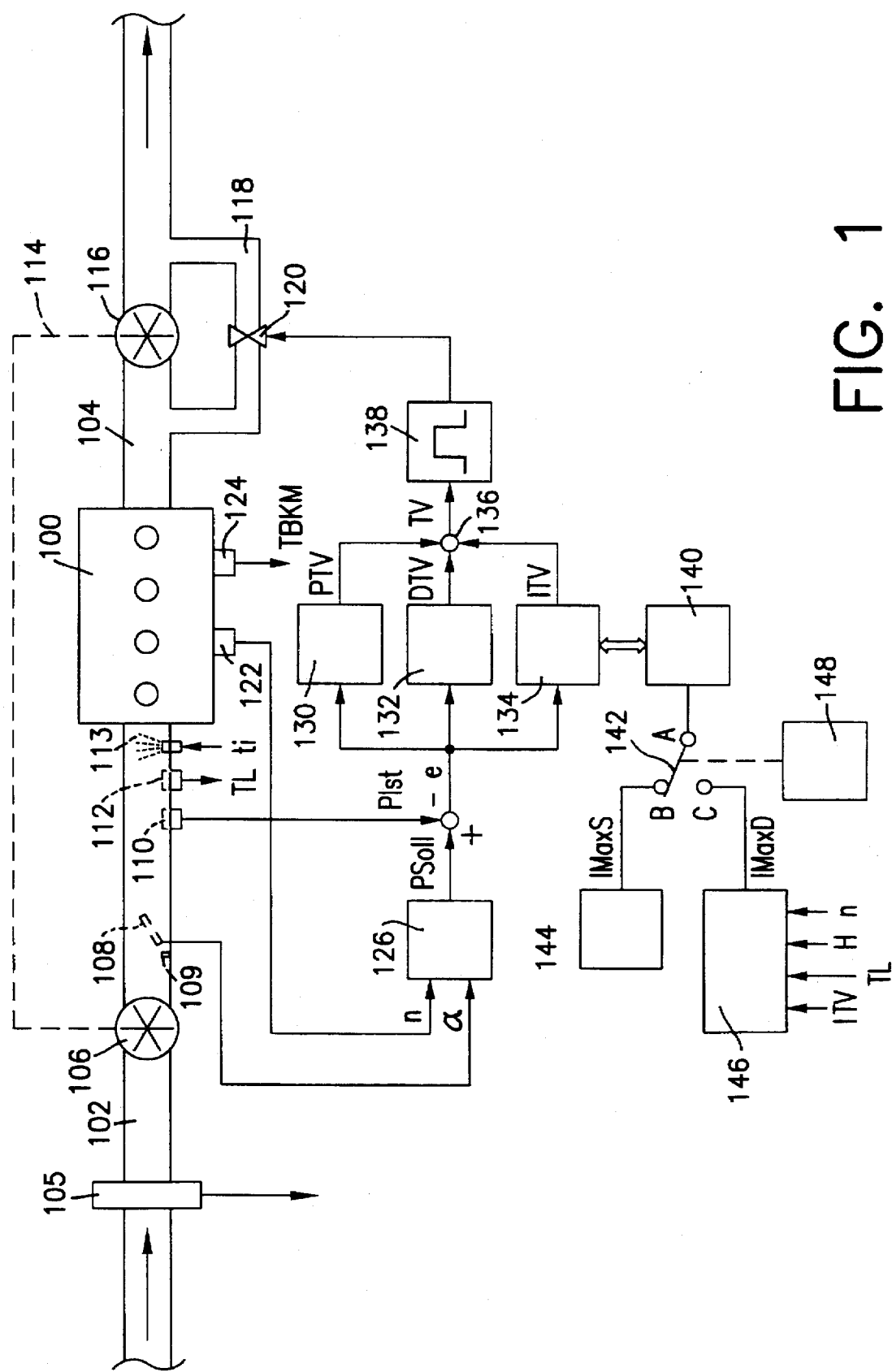
FIG. 1 shows a block diagram of the system according to the present invention.

FIG. 1 shows an internal combustion engine 100 with an intake duct 102 and an exhaust gas duct 104. Provided in the intake duct 102 are viewed in the direction of the sucked-in air—an air flow rate meter 105, a compressor 106, a throttle valve 108 with a sensor 109 for detecting the angle of aperture of the throttle valve 108, a pressure sensor 110 for detecting the actual value PIst of the charging pressure, a temperature sensor 112 for detecting the temperature TL of the charging air, and at least one injection nozzle 113. The compressor 116 is driven, via a connecting means 114, by a turbine 116 arranged in the exhaust gas duct 104. A bypass line 118 leads around the turbine 116. A bypass valve 120 is arranged in the bypass line 118. A rotational speed sensor 122 for detecting the rotational speed n of the internal combustion engine 100 and a temperature sensor 124 for detecting the temperature TBKM of the coolant are provided at the internal combustion engine 100.

The system according to the present invention is used to control the charging of the internal combustion engine 100. For this purpose, for example, the actual value PIst of the charging pressure which is detected with the charging pressure sensor 110 can be adjusted to a desired value PSoll of the charging pressure output by a characteristic diagram 126. The bypass valve 120 is actuated as a function of the deviation between PIst and PSoll and, as a result, the rotational speed of the turbine 116 is influenced. This influencing acts via the connecting means 114 on the compressor 106 which in turn influences the charging pressure downstream of the compressor 106, that is to say the actual value PIst of the charging pressure detected by the pressure sensor 110. The system for controlling the charging of the internal combustion engine 100 is described below.

The characteristic diagram 126 for the desired value PSoll of the charging pressure has two inputs, the first input being connected to the rotational speed sensor 122 and the second input being connected to the sensor 109 for detecting the angle of aperture of the throttle valve 108. The characteristic diagram 126 transmits the desired value PSoll of the charging pressure to a first input of a logic element 128 as a function of the signals n for the rotational speed and for the angle of aperture of the throttle valve 108 which are present at the two inputs. The second input of the logic element 128 is connected to the pressure sensor 110 for detecting the actual value PIst of the charging pressure. The logic element 128 identifies a control error e by forming the difference between the desired value PSoll of the charging pressure and the actual value PIst of the charging pressure and makes a corresponding signal available at the output.

The output of the logic element 128 is connected to the input of a proportional controller 130, the input of a differential controller 132 and the input of an integral controller 134. The outputs of these three controllers are each connected to one input of a logic element 136. In the logic element 136, the output signal PTV of the proportional controller 130, the output signal DTV of the differential controller 132 and the output signal ITV of the integral controller 134 are superimposed. The signal TV which is produced by the superimposition is made available at the output of the logic element 136. The output of the logic element 136 is connected to an actuation stage 138. The actuation stage 138 produces from the signal TV a signal for actuating the bypass valve 120 and passes on this signal to the bypass valve 120. The signal produced by the actuation stage 134 can be, for example, a pulse width-modulated signal.

The integral controller 134 is influenced by a limiter stage 140. A double arrow indicates that an exchange of data can take place in both directions between the integral controller 134 and the limiter stage 140. The limiter stage 140 ensures that a limit value IMax is not exceeded during the integration carried out in the integral controller. The limit value IMax corresponds either to a steady-state limit value IMaxS which is stored in a read only memory 144 or to a dynamic limit value IMaxD which is produced by a block 146. The switch position of a switch 142 which connects the input of the limiter stage 140 either to the output of the read only memory 144 or to the output of the block 146 determines whether the static limit value IMaxS or the dynamic limit value IMaxD is selected.

The switch 142 has three contacts, one contact A of the switch 142 being connected to the input of the limiter stage 140, one contact B being connected to the output of the read only memory 144 and one contact C being connected to the output of the block 146. In one switch position AB, the output of the read only memory 144 is connected to the input of the limiter stage 140, that is to say the signal IMaxS for the steady-state limit value is fed into the input of the limiter stage 140. In one switch position AC, the output of the block 146 is connected to the input of the limiter stage 140, that is to say the signal IMaxD for the dynamic limit value is fed into the input of the limiter stage 140.

The changing over between the switch positions AB and AC takes place by means of an operating state detector 148 depending on whether the internal combustion engine 100 is in a steady-state operating state or in a dynamic operating state. In the case of a steady-state operating state, the operating state detector 148 sets the switch position AB and, in the case of a dynamic operating state, it sets the switch position AC. The operating state detector 148 detects whether a steady-state or a dynamic operating state is present with reference to the control error e.

As soon as the control error e exceeds a threshold value, a dynamic bit is set in the operating state detector 148. If the sign of the control error e changes from a positive to a negative sign, the dynamic bit is deleted. Whenever the dynamic bit is set, the operating state detector 148 indicates a dynamic operating state for a prescribable time period, that is to say it adjusts the switch 142 into the switch position AC for this time period. For the rest of the time, the operating state detector 148 adjusts the switch 142 into the switch position AB. Thus, the dynamic limit value IMaxD is effective only during the prescribable time period. Afterwards, it is switched to the static limit value IMaxS which is higher than the dynamic limit value IMaxD. As a result, a complete compensation is ensured.

Figure 2:
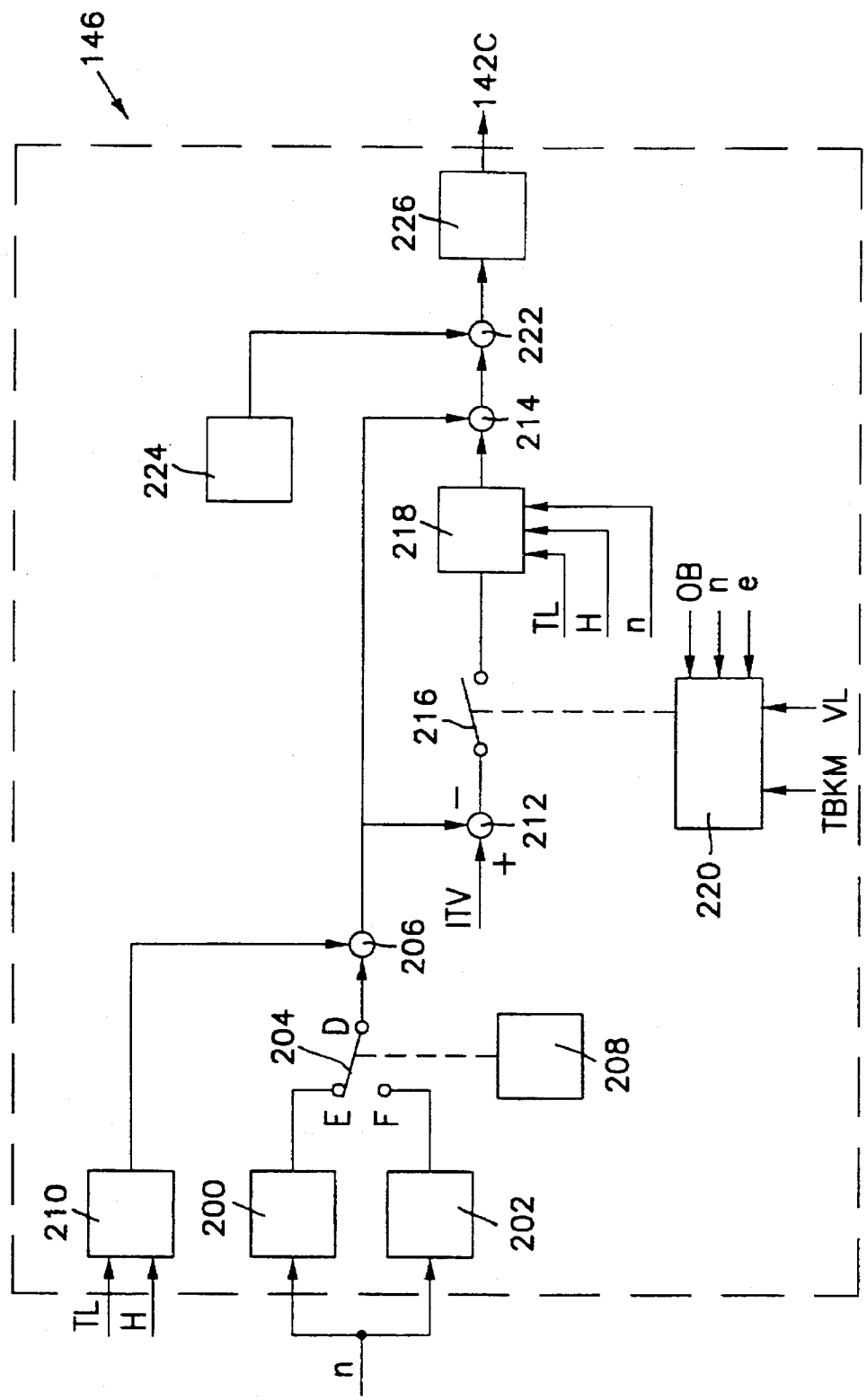
FIG. 2 shows a block diagram of the internal structure of the block 146 illustrated in FIG. 1 and produces the limitation value for the case of a dynamic operating state.

FIG. 2 shows a block circuit diagram of the internal wiring of the block 146 in FIG. 1, with which block 146 the dynamic limit value IMaxD is identified. A characteristic curve 200 outputs a basic value for the dynamic limit value IMaxD for the case in which no overboost is present and a further characteristic curve 202 outputs a basic value for the dynamic limit value IMaxD for the case in which an overboost is present. The signal n for the rotational speed of the internal combustion engine 100 is fed into the inputs of both characteristic curves. The output of the characteristic curve 200 is connected to a contact E of a switch 204 and the output of the characteristic curve 202 is connected to a contact F of the switch 204. Furthermore, the switch 204 has a contact D which is connected to a first input of a logic element 206. During overboost mode, the switch connects the contacts D and F and, otherwise, the contacts D and E. The switch 204 is controlled by means of an overboost detector 208 which sets the switching states described.

The second input of the logic element 206 is connected to the output of a characteristic diagram 210. In the characteristic diagram 210 correction values for the dynamic limit value IMaxD are stored as a function of operating parameters of the internal combustion engine 100. The operating parameters are fed into the inputs of the characteristic diagram 210, for example the signal TL for the charging air temperature or a signal H which depends on the altitude, etc. In the logic element 206 the correction value output by the characteristic diagram 210 is logically connected to the basic value for the dynamic limit value IMaxD which, depending on the position of the switch 204, originates from the characteristic curve 200 or the characteristic curve 202. In this way, a correction of the basic value for the dynamic limit value IMaxD is carried out in the logic element 206 as a function of the operating parameters.

The output of the logic element 206 is connected to a first input of a logic element 212 and a first input of a logic element 214. The signal ITV, which is output by the integral controller 134 illustrated in FIG. 1, is fed into the second input of the logic element 212. In the logic element 212 the signal for the corrected basic value of the dynamic limit value IMaxD is subtracted from the signal ITV and the result of this difference forming is made available at the output of the logic element 212.

The output of the logic element 212 is connected to a first contact of a switch 216 whose second contact is connected to an input of an adaptation memory 218. When the switch 216 is closed, the difference output by the logic element 212 is written as an adaptive correction into the adaptation memory 218.

Figure 3:
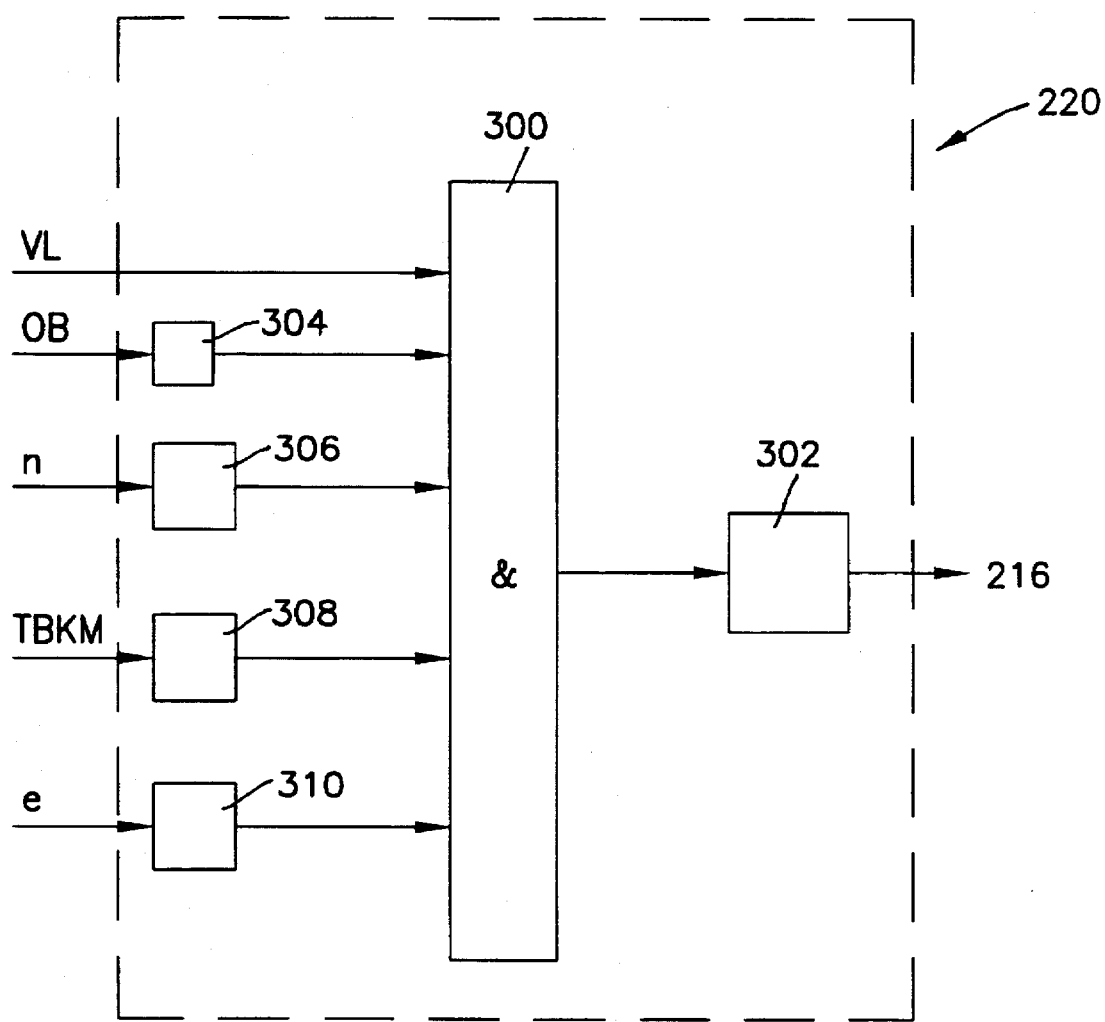
FIG. 3 represents, in the form of a block diagram, the operating conditions in which the adaptive correction of the limitation value is updated.

The switch 216 is controlled by an adaptation detector 220. The adaptation detector 220 closes the switch 216 if suitable operating conditions for the adaptation are present and opens the switch 216 if no adaptation is to take place. The mode of operation of the adaptation detector 220 is illustrated in FIG. 3 in the form of a block circuit diagram and is explained in greater detail below.

In the exemplary embodiment illustrated in FIG. 2, the adaptation memory 218 has further inputs. By means of these further inputs, signals, such as the signal TL for the temperature of the charging air, the signal H which depends on the atmospheric pressure and the signal n for the rotational speed of the internal combustion engine 100, can be fed in. The adaptation can depend on one or more of these characteristic operating variables. Moreover, further characteristic operating variables which have not been mentioned here are also possible. In a simple exemplary embodiment, the dependence of the adaptation on these characteristic operating variables is eliminated and the adaptation memory only has one input which is connected to the switch 216.

The output of the adaptation memory 218 is connected to the second input of the logic element 214 whose first input is connected to the output of the logic element 206. In the logic element 214 the output signal of the logic element 206 and the output signal of the adaptation memory 218 are superimposed, that is to say the corrected basic value for the dynamic limit value is provided with an adaptive correction. The result of the superimposition is made available at the output of the logic element 214. The output of the logic element 214 is connected to a first input of a logic element 222 whose second input is connected to the output of a read only memory 224. In the read only memory 224 a value is stored which corresponds to a small fraction of the dynamic limit value IMaxD and serves as a safety interval, that is to say in the logic element 222 the dynamic limit value IMaxD which is corrected as a function of characteristic operating variables and provided with an adaptive correction is increased by the value stored in the read only memory 224 in order to ensure that the dynamic limit value IMaxD is not selected to be too small.

The output of the logic element 222 is connected to the input of a limiter stage 226. The limiter stage limits the dynamic limit value IMaxD to a prescribable maximum value, for example to a pulse duty factor of 95%. The output of the limiter stage 226 is connected to the output of the block 146 illustrated in FIG. 1, that is to say the limiter stage 226 supplies the signal IMaxD to the contact C of the switch 142.

FIG. 3 shows a block circuit diagram which has the purpose of representing the mode of operation of the adaptation detector 220 in FIG. 2. An essential component of this block circuit diagram is an AND gate 300. This AND gate 300 has a series of inputs via which truth values from a series of statements are fed into the AND gate 300. In FIG. 3, five inputs are illustrated, but this number may be larger or smaller. The AND gate 300 outputs a signal at its output if the truth value "true" is fed into all of its inputs. The output of the AND gate 300 is connected to the output of a timer stage 302. The timer stage 302 outputs a signal at its output if a signal was present at its input at least during a prescribable time period. That is to say the truth value "true" was fed into all the inputs of the AND gate 300 at least during this time period.

If, in contrast, the truth value "false" is fed into at least one input of the AND gate 300 during the time period, the timer stage 302 does not output a signal at its output. The signal output by the timer stage 302 causes the switch 216 in FIG. 2 to be closed, that is to say signals can be fed immediately to the adaptation memory 218 and the values stored in the adaptation memory 218 can thus change.

If, in contrast, there is no signal present at the output of the timer stage 302, the switch 216 is opened and the values stored in the adaptation memory 218 are not changed. The truth values at the inputs of the AND gate 300 are derived from statements relating to characteristic operating variables. In an individual case, only some of the characteristic operating variables illustrated in FIG. 3 can be used or other characteristic operating variables can also be used. The characteristic operating variables in FIG. 3 are: load, overboost state, rotational speed, temperature of the coolant and control error of the charging pressure control.

The statement relating to the load characteristic operating variable is: "Is the internal combustion engine 100 in a full load state?". The truth value of this statement is represented by a signal VL. The signal VL can be produced for example by a full load switch which switches when the throttle valve is completely opened. The signal VL is fed into one of the inputs of the AND gate 300.

The statement relating to the overboost state characteristic operating variable is: "Is the internal combustion engine 100 in an overboost state?". The truth value of this statement is represented by a signal OB. If an overboost function is provided within the scope of the engine control, a signal which indicates this overboost function is also present, for example the signal OB. If the overboost function is activated, the signal OB represents the value "true" and, if the overboost function is not activated, the signal OB represents the value "false". Since the adaptation of the limitation value is to be permitted only if the overboost function is not activated, the signal OB is not fed directly into one of the inputs of the AND gate but rather via a negator 304 which negates the signal OB before it is fed into the AND gate 300, that is to say converts the value "true" into the value "false", and vice versa.

The statement relating to the rotational speed characteristic operating variable is: "The rotational speed exceeds a prescribable threshold value". In order to determine the truth content of this statement, the signal n for the rotational speed is fed into a comparator 306. Here, the signal n is compared with the prescribable threshold value and a signal for the truth content of the statement relating to the rotational speed is correspondingly output. The output of the comparator 306 is connected to one of the inputs of the AND gate 300. The statement relating to the temperature of the coolant characteristic operating variable is: "The temperature of the coolant has exceeded a prescribable threshold value". The truth value of this statement is identified similarly to the truth value for the rotational speed statement. For this purpose, the signal TBRM for the temperature of the coolant is fed into a comparator 308. Here, a comparison with the prescribable threshold value for the temperature of the coolant takes place. If the result of the comparison is that the signal TBKM exceeds the threshold value, the truth value "true" is issued at the output of the comparator 306, and if the signal TBRM does not exceed the threshold value, the truth value "false" is output. The output of the comparator 308 is connected to one of the inputs of the AND gate 300.

The statement relating to the control error is: "The absolute value of the control error is below a prescribable threshold value". The signal e for the control error is fed into a comparator 310. Here, the absolute value of the signal e is formed and compared with the prescribable threshold value. If the result of the comparison is that the absolute value is smaller than the threshold value, the truth value "true" is output. Otherwise, the truth value "false" is output. The output of the comparator 310 is connected to one of the inputs of the AND gate 300.

Accordingly, the AND gate 300 then outputs a signal if the signal VL indicates a full load state, the signal OB indicates that no overboost function is activated, the signal exceeds the threshold value for the rotational speed, the signal TBKM exceeds the threshold value for the temperature of the coolant, and the absolute value of the signal e is below the threshold value for the control error.

If all these conditions are fulfilled during the time period prescribed for the timer stage 302, the timer stage 302 causes the switch 216 to be closed so that the values stored in the adaptation memory 218 can be changed.

What is claimed is:

1. A system for controlling a charging pressure of an internal combustion engine, comprising:
    means for determining a present value of the charging pressure and for determining a control deviation between a desired value of the charging pressure and the present value of the charging pressure;
    an integration controller device for integrating the control deviation, the integrated control deviation being limited by a preselected integration limit, the integration limit having a first value for steady-state operation of the engine and having a second value for dynamic operation of the engine; and
    an actuation controller device coupled to the integration device, the actuation controller device generating a charging control signal as a function of the integrated control deviation, the charging control signal controlling the charging pressure.

2. The system according to claim 1, wherein the second value is a function of at least one characteristic operating variable of the engine.

3. The system according to claim 2, wherein the at least one characteristic operating variable includes at least one of a rotational speed of the engine, a charging air temperature, and an atmospheric pressure.

4. The system according to claim 1, wherein the second value is a function of whether an overboost function is activated.

5. The system according to claim 1, wherein the second value is a function of an adaptive correction value.

6. The system according to claim 5, wherein the adaptive correction value is a function of at least one characteristic operating variable.

7. The system according to claim 5, wherein the adaptive correction value is a function of whether an adaptation condition is fulfilled.

8. The system according to claim 7, wherein the adaptive correction value is changed if the adaptation condition is fulfilled.

9. The system according to claim 8, wherein the adaptation condition is fulfilled if at least one characteristic operating variable fulfills at least one condition for a preselected time period.

10. The system according to claim 1, wherein the second value is a function of a safety interval value.

11. The system according to claim 1, wherein the integration limit has the second value if a dynamic condition is fulfilled and has the first value if the dynamic condition is not fulfilled.

12. The system according to claim 11, wherein the dynamic condition is fulfilled for a preselected time period when the control deviation exceeds a preselected threshold value.

* * * * *